Patented Aug. 18, 1942

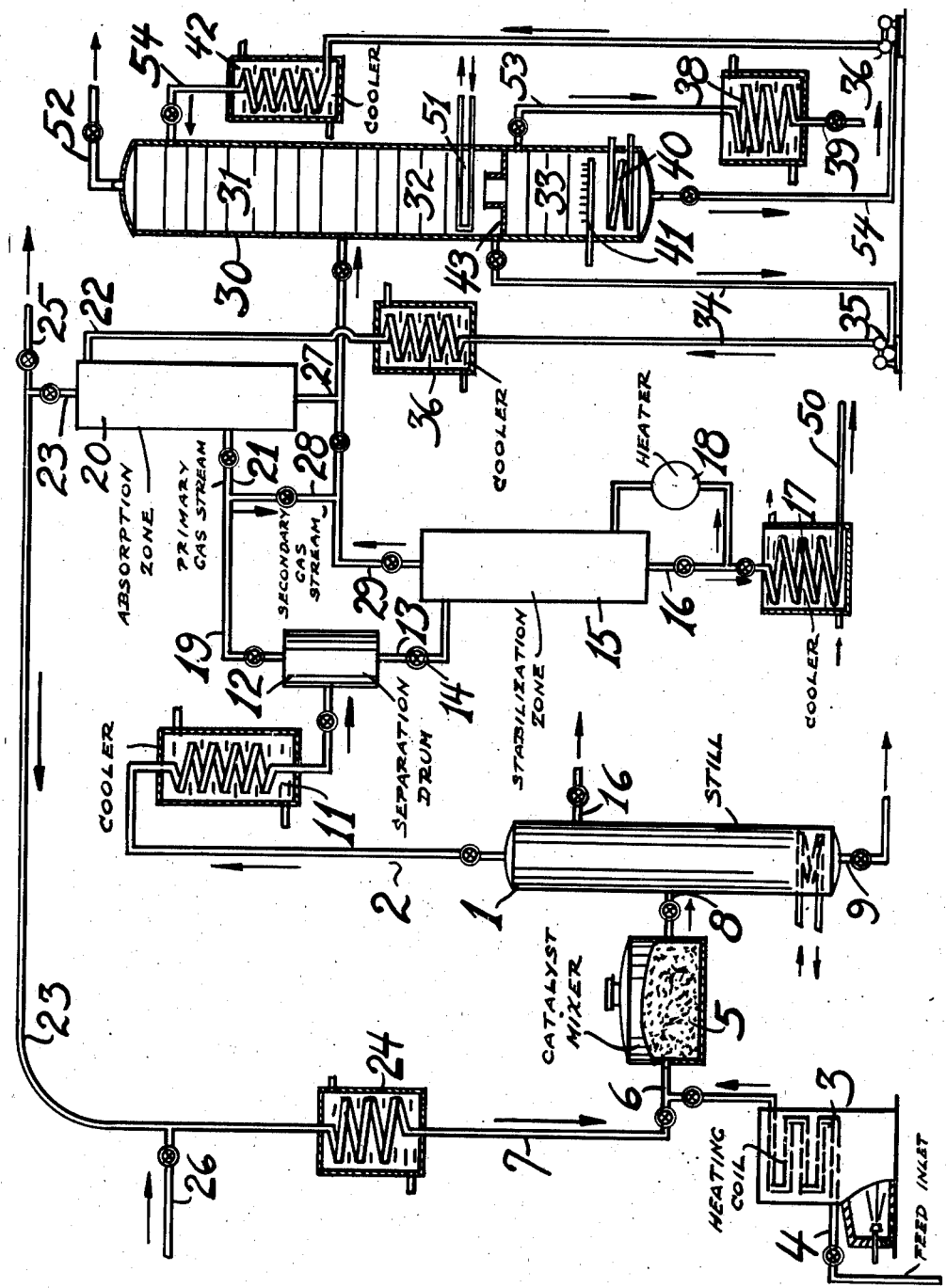

2,293,241

UNITED STATES PATENT OFFICE 2,293,241

REFINING PETROLEUM OILS

Donald L. Campbell, Roselle Park, N. J., assignor, by mesne assignments, to Standard Catalytic Company, a corporation of Delaware Application June 22, 1940, Serial No. 341,852

5 Claims. (Cl. 196—8)

The present invention relates to the refining of mineral oils. The invention is more particularly concerned with an improved process for the handling of gases and vapors comprising hydrogen and hydrocarbon constituents, and is especially adapted for the processing of products derived from catalytic cracking, and related refining operations conducted in the presence of hydrogen. In accordance with the present process these constituents are handled in a series of cooling, separating, distilling and absorption zones so arranged that an efficient segregation of the respective constituents is secured by an economical process. In accordance with the present process feed fractions comprising hydrogen, normally liquid and normally gaseous hydrocarbon constituents are passed into an initial separation zone in which an uncondensed fraction comprising hydrogen and normally gaseous hydrocarbon constituents are removed overhead and a condensed fraction substantially free of hydrogen is withdrawn as a bottoms and stabilized to remove any undesirable relatively low boiling constituents. The overhead from the initial separation zone is segregated into a primary and into a secondary gas stream. The primary gas stream is passed into a primary absorption zone operated under conditions adapted to remove overhead a vaporous product having a high concentration of hydrogen suitable for recycling purposes. The bottoms from the primary absorption zone are combined with the secondary gas stream and the overhead product from the stabilization zone and introduced into a refining zone comprising a tower consisting of an absorption section, a stabilization section, and a stripping section. Operating conditions are adjusted to segregate hydrocarbon fractions substantially free of undesirable relatively low boiling constituents and two absorption oil streams, each particularly adapted for effecting the recovery of desirable hydrocarbon constituents from different gas streams produced in the process.

It is known in the art to refine petroleum oils by various catalytic cracking and catalytic reforming operations utilizing hydrogen. In these operations it is desirable, in order to increase the efficiency of the process, to recycle hydrogen. In order to accomplish this various proposals and operations have been employed. These processes, in general, initially separate the hydrogen from the hydrocarbon constituents and then handle the hydrocarbon constituents in a manner to segregate and recover the desired hydrocarbon fractions. I have now discovered a process for the handling of gaseous fractions comprising hydrogen and hydrocarbon constituents by which it is possible to efficiently and economically segregate a hydrogen stream suitable for recycling and to simultaneously segregate and recover various desirable hydrocarbon constituents from undesirable materials. The process of my invention may be readily understood by reference to the attached drawing illustrating modifications of the same. For the purpose of illustration it is assumed that the feed gases are derived from a catalytic reforming operation conducted in the presence of hydrogen under conditions in which a net production of hydrogen results. Feed oil which for the purposes of description is assumed to be a petroleum oil boiling in the motor fuel boiling range is introduced into furnace 3 by means of feed line 4. The oil is heated in furnace 3 to the desired temperature and introduced into catalytic contacting unit 5 by means of line 6. Prior to introducing the heated feed oil vapors into catalytic contacting unit 5, they are mixed with heated hydrogen gases which are introduced by means of line 7. The catalytic contacted oil, after a sufficient time of contact at optimum temperature and pressure conditions is withdrawn from catalytic contacting unit 5 by means of line 8 and introduced into tower or still I in which a separation is made and a heavy polymer residue withdrawn by means of line 9. The overhead vaporous fraction comprising hydrogen and hydrocarbon constituents is withdrawn by means of line 2, passed through cooler II and introduced into initial separation zone 12. A liquid condensate substantially completely free of hydrogen is withdrawn from initial separation zone 12 by means of line 13, passed through pressure release valve 14 and introduced into stabilization zone 15. The temperature and pressure conditions on stabilization zone 15 are adapted to remove as a bottoms product by means of line 16 a liquid hydrocarbon fraction substantially completely free of undesirable relatively low boiling hydrocarbon constituents. For purposes of illustration it is assumed that the operating conditions in stabilization zone 15 are regulated to remove overhead hydrocarbon constituents containing four or less carbon atoms in the molecule. Thus a hydrocarbon fraction comprising constituents having five or more carbon atoms in the molecule substantially free of hydrogen and compounds containing four or less carbon atoms in the molecule is withdrawn by means of line 16, cooled in cooler 17, withdrawn from the system by means of line 50 and utilized in any desirable manner. The desired temperature is maintained in stabilization or debutanization zone 15 by means of reboiler arrangement 18.

The uncondensed gases removed from separation zone 12 by means of line 19 are segregated into a primary and into a secondary gas stream. The primary gas stream is introduced into absorption zone 20 by means of line 21 wherein it is countercurrently contacted with an absorption oil which is introduced into absorption zone 20 by means of line 22. Operating conditions, as for example oil rates, temperatures and pressures, are regulated to remove overhead from absorption zone 20 by means of line 23 a hydrogen gas stream substantially free of undesirable hydrocarbon constituents. This hydrogen rich gas stream is passed through heater 24 and recycled with the feed vapors to the catalytic reforming operation. Excess gas may be withdrawn from the system by means of line 25, while additional gas may be introduced into the system by means of line 26. The rich absorption oil containing the undesirable hydrocarbon constituents is withdrawn from absorption zone 20 by means of line 27 and combined with the secondary gas stream which by-passed absorption zone 20 by means of line 28, along with the overhead from the stabilization zone 15 which is removed by means of line 29. The three streams are introduced into refining zone 30 which comprises a tower consisting of an absorption section 31, a stabilization section 32 and a stripping section 33. The feed to the refining tower 30 is introduced at a point intermediate the absorption section 31 and the stabilization section 32.

The feed vapors to the refining zone flow upwardly through the absorption section 31 and contact down-flowing absorption oil which is introduced into the top of the absorption section by means of line 54. Efficient contact between the up-flowing vapors and down-flowing absorption oil is attained by contacting and distributing means such as bubble cap trays and the like. Temperature and pressure conditions, as well as absorption oil feed rates are adjusted so that the gases removed from the top of tower 30 by means of line 52 are stripped to the desired extent of recoverable hydrocarbons. These gases may be disposed of in any manner desirable. The absorption oil containing the dissolved hydrocarbons comprising butanes, butylenes, pentanes and higher boiling hydrocarbons passes downwardly through refining zone 30 into stabilizing section 32, along with the liquid portion of the feed to the refining tower wherein undesirable dissolved gases and hydrocarbon constituents boiling in the propane and lower boiling ranges are removed from the oil. These constituents pass upwardly through the tower and are removed from the system by means of line 52. As these gases rise through the stabilizing section small amounts of relatively higher boiling desirable hydrocarbons are also removed from the stabilization section, the whole rising as rich gas mixture into the absorption section at a temperature of 20° F. to 40° F. higher than the feed temperature. Sufficient absorption oil is supplied to dissolve these higher boiling constituents from this rich gas mixture which functions as a recycle element. A portion of the absorption oil substantially free of undesirable low boiling absorbed hydrocarbons collects in well 43 at the bottom of the stabilization section from which it is withdrawn by means of line 34 and pump 35. This oil is cooled in cooler 36 and recycled to absorption zone 20 in which it contacts the primary gas stream in the manner described. The remaining absorption oil, free of undesirable low boiling hydrocarbons, passes from stabilization section 32 into stripping section 33 in which the desired higher boiling recoverable hydrocarbons are removed from the absorption oil by vaporization. The vaporized recoverable hydrocarbons are removed from tower 30 by means of line 53, condensed in condenser 38, removed from the system by means of line 39 and handled in any manner desired, usually by blending with motor fuel products. Complete removal of the absorbed hydrocarbons from the absorption oil is effected by means of heating coil 40 and by means of open steam which may be introduced by means of line 41. The stripped absorption oil, free of recoverable hydrocarbons, is removed by means of line 54, cooled in cooler 42 and recycled to the top of the tower. The steam introduced into the base of the tower may be collected from the respective plates upon which it condenses and removed from the tower by known means.

The present invention may be widely varied. The invention essentially comprises an arrangement and sequence of separation, stabilization and refining zones by which it is possible to efficiently and economically segregate various hydrocarbon constituents as well as the hydrogen from vaporous mixtures containing the same.

The invention may be adapted for the processing of products derived from any refining operation conducted in the presence of hydrogen, and in which it is desirable to segregate the hydrocarbon constituent and to recycle hydrogen to the refining process. The invention, however, is particularly desirable for the processing of products secured from catalytic reforming operations conducted in the presence of hydrogen under conditions in which a net production of hydrogen occurs. In operations of this character petroleum feed oils, particularly petroleum feed oils boiling in the motor fuel boiling range, are contacted with catalysts of the type of aluminum oxide impregnated with or co-precipitated with molybdenum oxide or chromium oxides or equivalent catalysts at optimum temperatures and pressures for the desired time period. In general, the temperatures employed are in the range from about 900° F. to 1010° F., and the pressures employed are in the range from about 50 to 800 lbs./sq. in. gauge. Under certain conditions it is preferred to segregate the petroleum fraction from the catalytic reforming operation, conducted in the presence of hydrogen, into a relatively low boiling fraction boiling below about 200° F. to 250° F. and into a relatively high boiling fraction boiling in the range from about 200° F. to about 400° F. The relatively lower boiling fraction containing the hydrogen is cooled and passed through the initial separation zone without a substantial reduction in pressure and a separation made between the condensate and the vaporous constituents. The vaporous constituents are removed from the separation zone and segregated into a primary and secondary gas stream. The amount of the primary gas stream is controlled so that the desired quantity of hydrogen for recirculation is produced in the absorption zone. In general, the primary absorption zone is maintained at a temperature in the range of from about 80° F. to 120° F.

The stream comprising the overhead from the stabilization zone, the secondary gas stream, and the rich absorption oil from the primary absorption zone is introduced into the refining zone at a point intermediate the absorption section and the stabilization section. The method employed is to select the lowest boiling hydrocarbon constituent which it is desired to recover and to adjust the operating conditions to absorb the desired amount of this hydrocarbon constituent. Usually operating conditions are adjusted to recover butanes and butylenes as the lowest boiling desirable hydrocarbon constituents, but in some instances it may be desirable to recover propane and propylene, or other relatively low boiling hydrocarbon constituents. In an efficiently designed absorption tower, the partial pressure of the lowest boiling hydrocarbon, which it is desired to recover in the absorption oil at the point of introduction of the feed gases and liquid, is substantially equivalent to the partial pressure of this hydrocarbon in the entering gas. This lowest boiling hydrocarbon, generally termed the "key" component, is usually butane. Thus, the partial pressure of the butane in the hydrocarbon rich absorption oil at the point of introduction of the feed gases and the point of withdrawal of the absorption oil from the absorption section of the refining zone is substantially equivalent to the partial pressure of the butane in the entering gas. Normally the partial pressures of components having higher boiling points than butane, as for example, pentane, hexane, and the like contained in the hydrocarbon rich absorption oil leaving the absorber will be considerably less than the partial pressures of these constituents in the entering gas. This is due to an insufficient amount of these constituents in the inlet gas to give a concentration in the rich absorption oil to produce a partial pressure near that in the inlet gas. In general, the feed gases and liquid are introduced into the upper half of the tower, usually at a point somewhat below the upper third section.

The stabilizing section of the hydrocarbon vapor recovery tower positioned immediately below the point of introduction of feed gases comprises a sufficient number of bubble cap plates or equivalent means adapted to secure complete removal of undesirable relatively low boiling dissolved gaseous constituents from the absorption oil. The rate of flow of stripping steam necessary to secure this result will depend upon the pressure and temperature maintained in the system, the number of bubble cap plates employed, the characteristics of the particular absorption oil used, the character of the feed constituents and upon the rates of flow of menstruum and feed gases and liquid.

The stripping section maintained immediately below the stabilizing section likewise comprises a sufficient number of bubble cap plates or equivalent means adapted to secure substantially complete removal of the desirable higher boiling absorbed hydrocarbons from the absorption oil. The temperature necessary to secure this result likewise will depend upon the pressure maintained on the system, the character of the absorption oil, the character and concentration of the absorbed hydrocarbons, and upon the relative feed rates of flow of menstruum, absorbed hydrocarbons, and stripping steam. The absorbed hydrocarbons vaporized in the stripping section are withdrawn from the refining tower at a point intermediate the stabilizing and stripping sections. The point of withdrawal of these vapors from the tower is at a point at which the temperature in the tower is above the temperature at which the highest boiling absorbed hydrocarbon constituent condenses and is determined by general operating conditions.

The absorption oil may be any suitable relatively high boiling oil having a relatively low vapor pressure which will preferentially dissolve relatively higher boiling hydrocarbon constituents as compared to relatively lower boiling constituents. In general, the oil should be a clean, narrow cut petroleum oil boiling in the heavy naphtha, kerosene, or gas oil range, having a gravity in the range from about 27° to 40° A. P. I. and having a molecular weight in the range from about 180 to 280. A particularly desirable absorption oil boils in the range from about 600° F. to 750° F. The amount of absorption oil used per volume of gases will depend upon the composition of the feed gases, the temperature and pressure conditions of the operation, as well as upon the amount of the key component which it is desired to remove. When treating refinery gases at a pressure in the range from 60 pounds to 80 pounds per square inch, the amount of absorption oil varies in the range from about 40 gallons to 60 gallons of oil per 1,000 cubic feet of gas measured to 60° F. and at a pressure of one atmosphere. It is to be understood that in order to reduce the partial pressure of the lowest boiling constituent it is desired to recover in the absorption oil, known means may be employed to cool the gases rising from the stabilizing section into the absorption section and to cool the menstruum plus dissolved vapors between plates or on the plates near the bottom of the absorption section. It is also to be understood that some of the indirect heat may be added by means of another coil 51 situated so as to introduce heat at the base of the stabilizing section.

In order to more fully illustrate the invention, the following example is given which should not be construed as limiting the same in any manner whatsoever.

*Example*

A petroleum oil of a gravity of 50.5° A. P. I., and boiling in the range from about 225° F. to 413° F., when catalytically cracked at a temperature of about 950° F. and at a pressure of about 225 lbs./sq. in. in the presence of recycled gas comprising about 80% hydrogen, yields the following overhead product, the hydrocarbon constituents of which boil in the range shown.

| | Molecules, per cent |
|---|---|
| Hydrogen | 55.17 |
| Methane | 18.35 |
| Ethane | 4.89 |
| Propane | 3.16 |
| Butane | 1.74 |
| Pentane | 2.52 |
| Hexane | 3.12 |
| Heptane and heavier | 11.05 |
| | 100.00 |

This light hydrocarbon overhead fraction when cooled to a temperature of about 100° F. and passed to an initial separation zone yields a condensate and overhead fraction having the following analysis:

| | Overhead fraction | Condensate |
|---|---|---|
| | Mol. % | Mol. % |
| Hydrogen | 66.06 | 1.18 |
| Methane | 21.70 | 1.52 |
| Ethane | 5.49 | 1.94 |
| Propane | 3.22 | 2.90 |
| Butane | 1.35 | 3.68 |
| Pentane | 1.16 | 9.25 |
| Hexane | 0.67 | 15.28 |
| Heptane and heavier | 0.35 | 64.25 |
| | 100.00 | 100.00 |

The overhead fraction from the initial separation zone is segregated into a primary gas stream comprising about 85.8% of the total overhead and a secondary gas stream comprising about 14.2% of the total overhead. The primary gas stream is contacted in an absorption zone with 355 gallons of absorption oil per thousand cubic feet of gas measured at 60° F. and one atmosphere at a pressure of about 185 lbs./sq. in., a tower top temperature of about 80° F., and at a tower bottom temperature of about 100° F. Under these conditions a stripped gas stream comprising about 80 mol. % hydrogen and 20 mol. % methane is removed overhead and recycled to the catalytic cracking operation.

The condensate from the separation zone is passed to a stabilization zone and processed in a manner to produce a bottoms product substantially free of hydrocarbon constituents boiling in the butane and lower boiling range. The overhead from the stabilization zone, together with the secondary gas stream and the rich absorption oil withdrawn from the absorption zone, is passed into a refining tower at a point intermediate the absorption section and the stabilization section. The temperature at the top of the tower is maintained at about 80° F., while the temperature at the bottom of the tower is maintained at about 420° F. The pressure on the tower is maintained at about 70 pounds per square inch gauge. The gases in the absorption section are countercurrently contacted with a 37° A. P. I. absorption oil having a molecular weight of about 180. The oil rate is approximately 46 gallons of oil per 1,000 cubic feet of gas. A gas mixture comprising methane, ethane, propane, and about 20% of the butane is withdrawn from the top of the tower. The absorption oil containing the dissolved desirable recoverable hydrocarbons and a small amount of undesirable lower boiling constituents flows downwardly into a stabilizing section, the temperature of which progressively increases from plate to plate to a temperature of about 160° F. In this section substantially all undesirable constituents are removed from the absorption oil. A portion of the absorption oil substantially free of undesirable low boiling constituents and containing an amount of butane and higher boiling hydrocarbon constituents is withdrawn from the bottom of the stabilization section, cooled to about 80° F. and returned to the top of the absorption tower employed in the treatment of the primary gas stream. The remaining absorption oil containing the dissolved desirable hydrocarbons then flows downwardly into the stripping section, the temperature of which increases progressively to a temperature of about 420° F. In this section the remaining butane, the pentane, and other recoverable hydrocarbons are vaporized from the absorption oil. These gases are withdrawn from the tower in the vapor state between the stabilizing and stripping sections at a temperature of about 170° F., condensed and utilized in motor fuels. The absorption oil free of feed gases is withdrawn from the bottom of the tower at a temperature of about 420° F., cooled to about 80° F., and recycled to the top of the tower. One-half a pound of stripping steam is used per gallon of absorption oil circulated.

What I claim as new and wish to protect by Letters Patent is:

1. Process for the segregation of various hydrocarbon constituents and hydrogen from feed gas mixtures containing the same comprising cooling the feed gases in a cooling zone, passing the same to a separation zone, removing a condensate and an uncondensed vaporous product from the separation zone, introducing the condensate into a stabilization zone, removing relatively low boiling hydrocarbon constituents as an overhead product from said stabilization zone, segregating said uncondensed vaporous product into a primary and into a secondary gas stream, treating said primary gas stream with an absorption oil under conditions to remove overhead a gas stream comprising hydrogen, and to remove as a bottoms a rich absorption oil, combining the rich absorption oil, the secondary gas stream and the overhead from said stabilization zone and passing the same to a refining tower consisting of an absorption section, a stabilization section, and a stripping section, regulating conditions in said refining tower to remove overhead relatively low boiling hydrocarbon constituents, to remove as a vapor side stream relatively high boiling hydrocarbon constituents, and to remove as a bottoms an absorption oil substantially free of hydrocarbon constituents dissolved in the absorption zone.

2. Process in accordance with claim 1 in which the absorption oil used to treat said primary gas stream is withdrawn from said refining tower intermediate said stabilization section and said stripping section.

3. Process for the segregation of hydrocarbon constituents containing three and less hydrocarbon atoms in the molecule from hydrocarbon constituents containing four and more carbon atoms in the molecule and for the segregation of a gas stream comprising hydrogen from feed gas mixtures containing the same comprising cooling the feed gases in a cooling zone, passing the same to a separation zone, removing a condensate substantially free of hydrogen and an uncondensed vaporous product from the separation zone, introducing the condensate into a stabilization zone, removing as an overhead product from said stabilization zone hydrocarbon constituents containing four and less carbon atoms in the molecule, segregating said uncondensed vaporous product into a primary gas stream and into a secondary gas stream, treating said primary gas stream with an absorption oil under conditions to remove overhead a gas stream comprising a high concentration of hydrogen and to remove as a bottoms a rich absorption oil, combining the rich absorption oil, the secondary gas stream, and the overhead from said stabilization zone and passing the same to refining tower consisting of an absorption section, a stabilization section, and a stripping section, regulating conditions in said refining tower to remove overhead hydrocarbon constituents containing three and less carbon atoms in the molecule, to remove as a vapor side stream hydrocarbon constituents containing four and more carbon atoms in the molecule and to remove as a bottoms an absorption oil substantially free of dissolved hydrocarbon constituents.

4. Process in accordance with claim 3 in which the feed to the refining tower is introduced at a point intermediate the absorption section and the stabilization section, and in which the hydrocarbon constituents containing four or more carbon atoms in the molecule are withdrawn from a point intermediate the stabilization section and the stripping section.

5. Process as defined by claim 3, in which the absorption oil employed for treating said primary gas stream is withdrawn from said refining tower at a point intermediate said stabilization section and said stripping section.

DONALD L. CAMPBELL.